(12) United States Patent
Basir et al.

(10) Patent No.: US 10,870,414 B2
(45) Date of Patent: Dec. 22, 2020

(54) VEHICLE MONITORING SYSTEM WITH AUTOMATIC DRIVER IDENTIFICATION

(71) Applicant: Appy Risk Technologies Limited, Waterloo (CA)

(72) Inventors: Otman A. Basir, Waterloo (CA); William Ben Miners, Guelph (CA); Seyed Hamidreza Jamali, Waterloo (CA); Daniel Evan Lajuenesse, Aurora (CA)

(73) Assignee: Appy Risk Technologies Limited

( * ) Notice: Subject to any disclaimer, the term of this patent is extended or adjusted under 35 U.S.C. 154(b) by 0 days.

(21) Appl. No.: 15/834,439

(22) Filed: Dec. 7, 2017

(65) Prior Publication Data

US 2018/0361995 A1 Dec. 20, 2018

Related U.S. Application Data

(63) Continuation of application No. 13/570,845, filed on Aug. 9, 2012, now Pat. No. 9,855,919.

(60) Provisional application No. 61/521,597, filed on Aug. 9, 2011.

(51) Int. Cl.
*B60R 25/33* (2013.01)

(52) U.S. Cl.
CPC .................................. *B60R 25/33* (2013.01)

(58) Field of Classification Search
USPC .......................................................... 701/1
See application file for complete search history.

(56) References Cited

U.S. PATENT DOCUMENTS

| | | | | |
|---|---|---|---|---|
| 2008/0319602 A1* | 12/2008 | McClellan | ............. | G07C 5/008 701/31.4 |
| 2010/0019964 A1* | 1/2010 | Huang | .................. | G01M 17/06 342/357.31 |
| 2010/0023183 A1* | 1/2010 | Huang | .................. | B60W 30/12 701/1 |
| 2010/0023223 A1* | 1/2010 | Huang | .................. | B60W 40/09 701/44 |
| 2010/0023245 A1* | 1/2010 | Huang | .................. | B60W 40/09 701/117 |
| 2010/0087987 A1* | 4/2010 | Huang | .................. | B60W 40/08 701/36 |
| 2011/0112717 A1* | 5/2011 | Resner | .................... | G07C 5/085 701/31.4 |
| 2012/0209634 A1* | 8/2012 | Ling | .................. | G06Q 10/0833 705/4 |
| 2013/0030605 A1* | 1/2013 | Basir | ................... | G01C 21/3461 701/1 |
| 2013/0041521 A1* | 2/2013 | Basir | ....................... | B60R 25/33 701/1 |
| 2013/0046510 A1* | 2/2013 | Bowne | ............... | G06Q 10/0639 702/187 |
| 2013/0344856 A1* | 12/2013 | Silver | .................... | G06N 20/00 455/418 |
| 2014/0207518 A1* | 7/2014 | Kannan | ............. | G06Q 30/0201 705/7.29 |

* cited by examiner

*Primary Examiner* — Tyler D Paige
(74) *Attorney, Agent, or Firm* — Carlson, Gaskey & Olds, P.C.

(57) ABSTRACT

A vehicle monitoring system includes at least one sensor in the vehicle. A processor receiving information from the at least one sensor, the processor programmed to automatically identify a driver of the vehicle based upon the information from the at least one sensor.

21 Claims, 2 Drawing Sheets

VEHICLE MONITORING SYSTEM WITH AUTOMATIC DRIVER IDENTIFICATION

This application is a continuation of application Ser. No. 13/570,845, which was filed on Aug. 9, 2012, which claims priority to U.S. Provisional Application Ser. No. 61/521,597, filed Aug. 9, 2011.

BACKGROUND

Existing vehicle monitoring systems may monitor vehicle location as well as driver behavior for various reasons, such as insurance rates, fleet monitoring, and parental supervision.

Telematics and advanced vehicle analysis activities are important to determine the behavior of the vehicle itself, including aggressive driving maneuvers, fuel efficiency, vehicle health, and acceleration profiles. This analysis provides valuable information about the dynamic behavior, location, and status of the vehicle itself, but has not been able to characterize the driver of the vehicle. If the driver of the vehicle is known, any vehicle analysis activity can be extended to include association with not only the vehicle, but also the individual behind the wheel.

Current driver identification approaches involve:

A physical identifier (RFID tag, keyfob, mobile phone, physical key),

A password (data entry, fingerprint), or

A fixed driver schedule.

Although these approaches are suitable in many scenarios, they require the driver to take an active role in the identification process.

SUMMARY

The present invention provides automatic identification of a driver of the vehicle based upon many parameters, including how the driver drives.

A vehicle monitoring system includes at least one sensor in the vehicle. A processor receiving information from the at least one sensor, the processor programmed to automatically identify a driver of the vehicle based upon the information from the at least one sensor.

DETAILED DESCRIPTION

Figure 1:
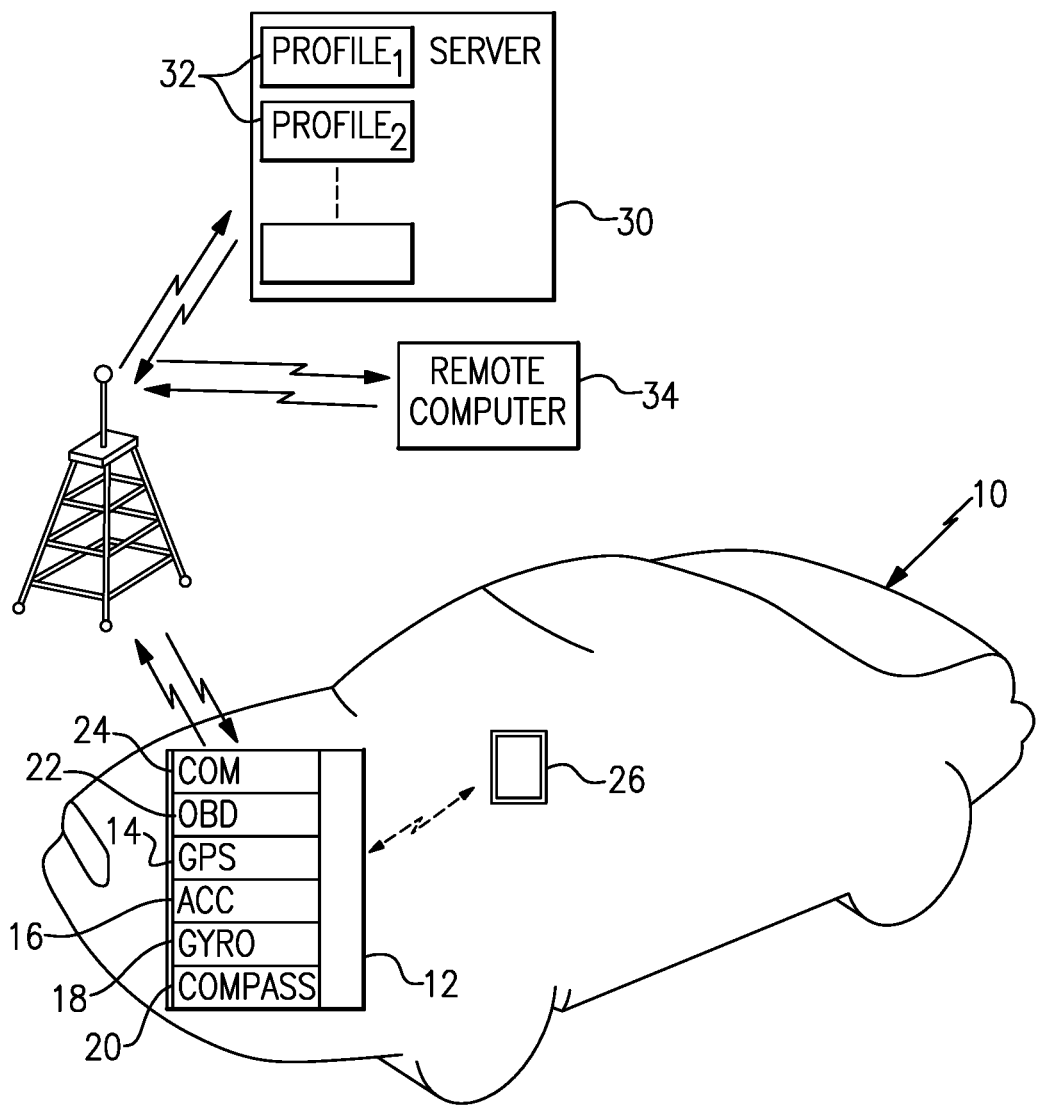
FIG. 1 is a schematic of a vehicle monitoring system according to one embodiment.
Figure 2:
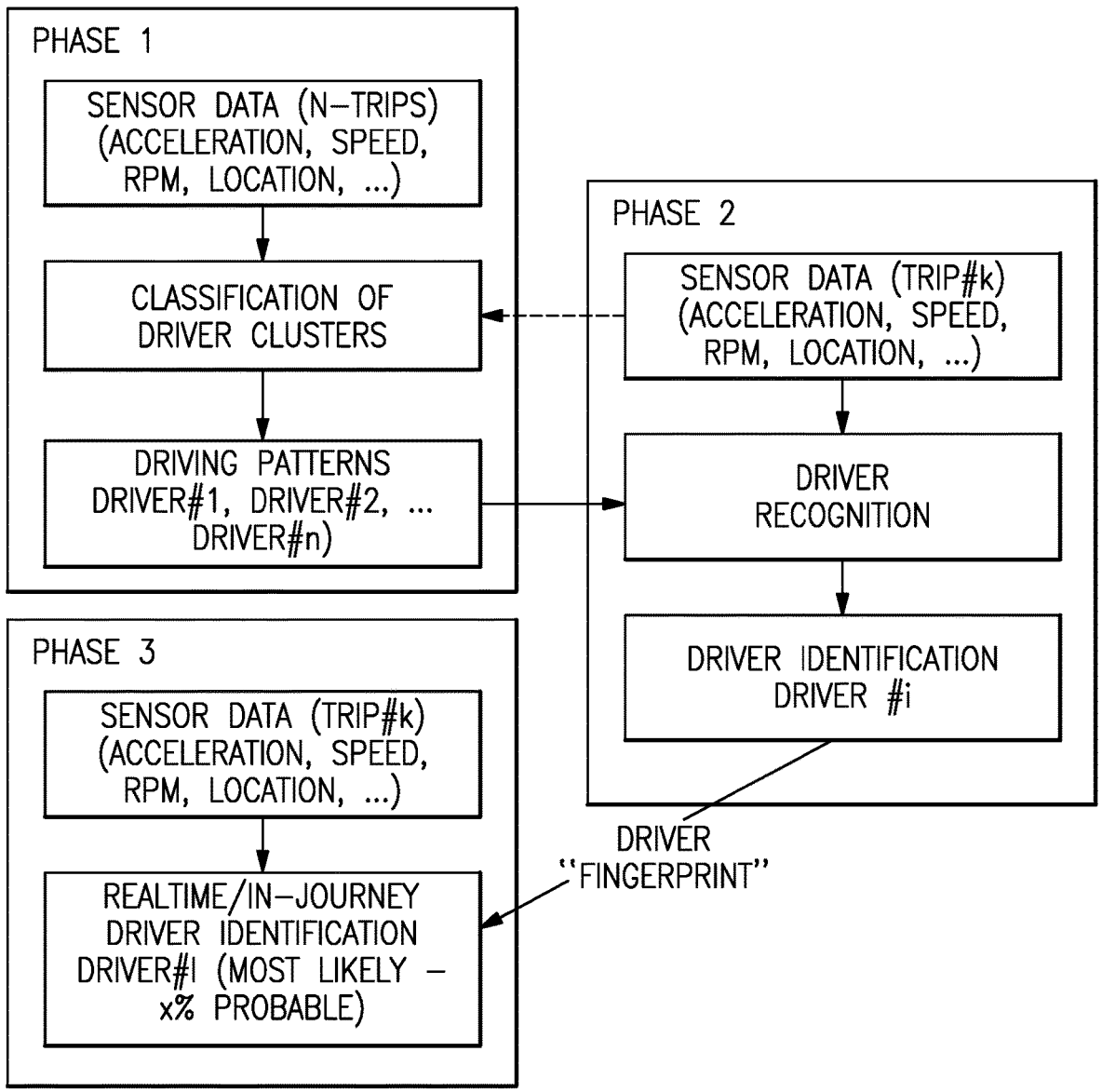
FIG. 2 shows one possible flowchart for the automatic driver identification that can be used in the vehicle monitoring system of FIG. 1.

Referring to FIG. 1, a motor vehicle 10 includes a plurality of data gathering devices that communicate information to a device 12 installed within the vehicle 10. The example data gathering devices include a global positioning satellite (GPS) receiver 14, an accelerometer 16, a gyroscope 18 and an electronic compass 20, which could be housed within the device 12 (along with a processor and suitable electronic storage, suitable programming, etc). As appreciated, other data monitoring systems could be utilized within the contemplation of this invention. Data may also be collected from an onboard diagnostic port (OBD) 22 that provides data indicative of vehicle engine operating parameters such as engine speed, temperature and other information that is related to mechanical operation of the vehicle, such as the existing OBD-II standard port on vehicles. Moreover, any other data that is available to the vehicle 10 could also be communicated to the device 12 for gathering and compilation of the operation summaries of interest in categorizing the overall operation of the vehicle 10. Not all of the sensors mentioned here are necessary, however, as they are only listed as examples.

The device 12 may also include a communication module 24 (such as cell phone, satellite, wi-fi, etc.) that provides a connection to a wide-area network (such as the Internet). Alternatively, the communication module 24 may connect to a wide-area network (such as the Internet) via a user's cell phone 26 or other device providing communication.

The in vehicle device 12 gathers data from the various sensors mounted within the vehicle 10 and stores that data. The in vehicle device 12 transmits this data (or summaries thereof) as a transmission signal via the communication module 24 through a wireless network to a server 30. The server 30 is one or more computers with processors, storage (e.g. RAM, SSD, hard drives, or other electronic or magnetic storage), suitably programmed to perform the functions described herein. The server 30 utilizes the received data to categorize vehicle operating conditions in order to determine or track vehicle use. This data can be utilized for tracking and determining various parameters such as driver behavior, insurance premiums for the motor vehicle, tracking data utilized to determine proper operation of the vehicle and other information that may provide value such as alerting a maintenance depot or service center when a specific vehicle is in need of such maintenance.

The server includes a plurality of profiles 32, each associated with a vehicle 10 (or alternatively, with a user). Among other things, the profiles 32 each contain information about the vehicle 10 (or user) including some or all of the gathered data (or summaries thereof). Some or all of the data (or summaries thereof) may be accessible to the user via a computer 34 over a wide area network (such as the Internet), such as fuel efficiency, environmental issues, location, maintenance, etc. The user can also customize some aspects of the profile 32.

The automatic driver identification invention eliminates the need for the driver to actively participate in the identification process by leveraging available information to automatically discern the driver for each journey. The following automatic driver identification programs and algorithms can be performed by the server 30 or by the in vehicle device 12, or some combination of the two.

Information for driver identification is obtained from in-vehicle sensors (such as the sensors 14, 16, 18, 20, 22 of FIG. 1), from passive or active RF sources associated with the driver (e.g. cell phone 26), from time and location sources (e.g. gps 14, obd 22, accelerometer 16, gyro 18, compass 20, etc), and from external sources where available. Available information is analyzed over multiple journeys to:

Identify the number of distinct drivers (n), and

Recognize which of the n drivers are driving during each journey.

This approach has applications to a shared personal vehicle 10, where multiple people in the household may be driving the vehicle 10 at different times of day. It also has applications in fleet scenarios where multiple drivers may share the same vehicle 10. In more complex fleet scenarios, where there is a n-to-m mapping between multiple drivers (n) and multiple vehicles (m), an extension to this approach can be applied to:

Identify the number of distinct drivers (n) across all vehicles (m), and

Recognize which of the n drivers are driving in each vehicle during each journey.

In scenarios where no prior information about the driving behavior of drivers is known, the method adaptively estimates the clusters of driving patterns. Then, using a classifier it assigns each driver to a specific cluster. This two-stage process is important to first classify driving clusters, and then identify individual drivers. This classification process ensures all available driving and vehicle data across one or more vehicles can be effectively leveraged to identify both the number and times at which each driver was operating each vehicle without the need to predetermine and store preset feature data for each driver.

The first phase is performed based on several trips at the beginning and will continue in parallel with the second one in order to adaptively update the number and pattern of clusters. This is required as the number of trips for clustering purposes may not be adequate and may exclude some drivers. The second phase is trip-based, which indicates which driver has used the vehicle during that specific trip.

The trip-based analysis can also be extended to deliver an online, in-trip measure of the most likely driver given partial evidence from the current trip and vehicle. The realtime measure is realized as a set of probabilities for each known driver, and can be valuable to ensure in-trip feedback can be tailored to the most likely driver at the time. Knowledge of the driver within each trip also ensures the feedback approach and timing can be selected to maximize the benefits to the driver. Some drivers may respond better to feedback delivered directly and immediately, whereas other drivers may respond better with feedback in the form of short digests or summaries at appropriate intervals.

For the first phase, the system incorporates two layers of data collection and analysis, i.e., Measurement and Clustering. In the first layer, the measurement module collects the data from available sensors. Examples of data that may be included are;

Vertical, longitudinal and lateral acceleration,
Speed,
Rotation,
Direct driver control parameters, which includes variables such as the accelerator position and brake application,
Engine parameters, such as RPM, engine throttle,
Idling time
Precise vehicle location, using GPS systems,—including start of trip, end of trip, and the journey itself
Relative vehicle location, using vehicle-to-vehicle links, proximity sensors, and other sources,
Environmental information, including road conditions, traffic, incidents, and weather,
Internal RF activity, including use of Bluetooth systems, passive or active RFID, and mobile phone activity,
Approximate vehicle location, using external RF signals, and
Time.

Using feature extraction and pattern classification algorithms, the first stage classifies the driving behavior over different maneuver types. The maneuvers may include aggressive accelerations or decelerations (sudden brakes), turns and lane changes, and excessive speed. Based on the rate and severity of maneuvers and the speed profile, the driving clusters are created. A similar classification exercise is performed with selected subsets and/or all of the available parameters to help improve the precision of driver identification given available historical information. Unsupervised learning such as k-means or clustering is also used to discover other classes that constitute unique characteristics.

Driver identification includes: determining the identity of the driver (eg, John x) or type of driver (eg, aggressive), frequency of user (e.g, frequent driver of the vehicle, vs infrequent driver of the vehicle), or any other possible classes that can be discovered for the driving and control parameters of the car.

Given a set of available measurements and key driver indicators (KDIs), it is possible to identify correlations between measurements and specific journeys. Although each journey will contain variations in measurements, some journeys may have more similar sets of measurements and KDIs when considered as a group, while other journeys or groups of journeys may differ. Each similar group of journeys can be combined into a cluster without requiring prior knowledge about the driver, preset measurements, or additional information. This clustering process is important to estimate the total number of distinct drivers across a set of journeys, and to associate each journey with a specific cluster or group. Each automatically identified cluster is then subsequently compared with historical information to identify both existing (previously known/labeled) drivers and also identify potential new drivers described by new clusters emerging from the dataset.

A high level summary of this invention is as follows:

The system and methods of the present invention provide automatic classification of the total number of drivers and the most likely driver operating each vehicle during each journey using one or more supplemental sources of data over multiple journeys. Examples of data sources include:

Vehicle health sensors (oxygen sensors, emissions levels, battery usage, coolant temperature, etc.);
Direct driver control parameters (accelerator position, brake pressure, speed-sequence, speed before intersections, pre-stop acceleration, takeoff acceleration, maneuvering, and steering, braking, etc.);
Voice based speaker identification (in vehicles where microphones are available);
Vehicle-to-vehicle communication channels;
Vehicle-to-infrastructure communication channels;
Location information (precise/GNSS, approximate/GSM, or relative/proximity);
Vehicle engine parameters (speed, RPM, throttle, etc., some of which may be available from OBD);
Time (time of day, journey time, idling time, time between start of engine and start of movement);
In-vehicle sensors (occupant classification sensors, accelerometer, gyro, speed, etc.);
In-vehicle RF (mobile phone activity, passive or active RF, NFC, etc.);
Travel environment: weather, traffic, accidents, road conditions, etc.;
Seating control and interior comfort parameters, steering wheel parameters (how the steering wheel is set up), rear mirror setting parameters, side mirror setting parameters.

The system and methods provide identification of a common driver across multiple journeys spanning one or more vehicles. The system and methods can provide identification of the total number of drivers involved in a set of journeys performed by one or more vehicles. A driver "fingerprint" is created that can be used to identify the driver using indirect external information and metadata. Parameters are reduced into key driver indicators suitable for a given set of drivers.

Driver identification can be refined when the number of drivers, or when specific driver-to-journey links may be known in advance (human readable labels/names for each driver, identification of potential conflicts in records, and improvements to classification precision). Driver/vehicle mismatch can be detected based on learned journey patterns, or through cross-referencing against planned schedules, which may be accessible in the driver profile and/or via the driver's smart phone 26. Driver behavior can be predicted based on historical patterns and drivers with similar key driver indicators.

A pattern discovery algorithm is used to discover consistent driver characteristics to refine the accuracy of the classification process.

Regular/consistent trip starting locations (home/work), intermediate stops (gas stations), and destinations are used as features as well as context to refine the classification process.

The classification process can produce the class-behavior or the name of the driver that the behavior of which fits the detected driver behavior.

An algorithm is used to discover temporal context to the driver behavior, e.g.: morning behavior, afternoon behavior, winter behavior, summer behavior.

An algorithm is used to discover weather related behavior context: rain driving behavior, snow driving behavior, hot driving behavior, cold driving behavior, etc.

An algorithm is used to discover spatial context: highway driving behavior, street driving behavior, etc.

An algorithm is used to discover traffic conditions contextual behavior: driving behavior in free traffic, driving behavior in heaving traffic, driving behavior in congested traffic congestion conditions.

Human input can be incorporated as another input into the classification process or post-classification to label each class (typically with the driver's name), and to correct inaccurate historical assignments. All human feedback is audited and preserved alongside the data itself to maintain a reliable history of both driver assignments and manual adjustments. Human feedback differs from a schedule only in the sense that it is provided after the completion of journeys rather than in advance.

The automatic identification of the driver can be used for monitoring driver behavior, such as for determining an insurance rate for the vehicle or for parents to monitor their children driving or for supervisors to monitor drivers of a fleet or pool of vehicles.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle monitoring system comprising:
    at least one sensor in the vehicle, wherein the at least one sensor monitors driving behavior, including vehicle speed;
    a processor receiving information from the at least one sensor, the processor programmed to automatically determine an identity of a driver of the vehicle based upon the information from the at least one sensor regarding driving behavior.

2. The vehicle monitoring system of claim 1 wherein the processor receives the information during a plurality of journeys of the vehicle.

3. The vehicle monitoring system of claim 1 wherein the at least one sensor includes a plurality of sensors.

4. The vehicle monitoring system of claim 1 wherein the processor receives information from a plurality of sensors in a plurality of vehicles, including the at least one sensor in the vehicle, and wherein the processor is programmed to identify the driver of the vehicle based upon the information from more than one vehicle.

5. The vehicle monitoring system of claim 1 wherein the processor receives information from the at least one sensor over a plurality of journeys by the vehicle and wherein the processor is programmed to cluster journeys based upon information from the at least one sensor during each journey.

6. The vehicle monitoring system of claim 5 wherein the processor is programmed to determine that a cluster of journeys was driven by the identified driver based upon the information from the at least one sensor.

7. The vehicle monitoring system of claim 6 wherein the processor is programmed to determine that a new journey was driven by the identified driver based upon the information from the at least one sensor and based upon the information in the cluster of journeys.

8. The system of claim 1 wherein the at least one sensor monitors vehicle acceleration.

9. The system of claim 8 wherein the processor is programmed to determine an identity of the driver of the vehicle based upon the information from the at least one sensor regarding driving behavior.

10. A method for automatically identifying a driver of a vehicle including the steps of:
    a) receiving at a processor information from at least one vehicle regarding driving behavior, the driving behavior including a plurality of vehicle maneuvers;
    b) automatically determining an identity of a driver of the vehicle in the processor based upon the information from the at least one vehicle.

11. The method of claim 10 further including the step of receiving the information during a plurality of journeys of the at least one vehicle.

12. The method of claim 10 wherein the information from the at least one vehicle is from a plurality of sensors.

13. The method of claim 10 wherein the processor receives information from a plurality of sensors in a plurality of vehicles, including the at least one sensor in the vehicle, and wherein the processor is programmed to identify the driver of the vehicle based upon the information from more than one vehicle.

14. The method of claim 10 wherein said step a) includes the step of receiving the information over a plurality of journeys by the vehicle and clustering journeys based upon information from the at least one vehicle during each journey.

15. The method of claim 14 further including the step of determining that a cluster of journeys was driven by the identified driver based upon the information from the at least one vehicle.

16. The method of claim 15 further including the step of determining that a new journey was driven by the identified driver based upon the information from the at least one vehicle and based upon the information in the cluster of journeys.

17. The method of claim 10 wherein the step of identifying of the driver is also based upon a schedule of the driver.

18. The method of claim 10 wherein said step b) is performed without reference to any existing knowledge regarding the driver.

19. The method of claim 10 wherein the plurality of vehicle maneuvers includes a plurality of vehicle maneuver types.

20. A method for automatically identifying a driver of a vehicle including the steps of:
- a) receiving at a processor information from at least one vehicle regarding driving behavior during a plurality of journeys of the at least one vehicle;
- b) automatically determining that a cluster of the plurality of journeys was driven by a single driver based upon the information from the at least one vehicle.

21. The method of claim 20 wherein the information includes speed and acceleration.

* * * * *

UNITED STATES PATENT AND TRADEMARK OFFICE
CERTIFICATE OF CORRECTION

PATENT NO. : 10,870,414 B2  
APPLICATION NO. : 15/834439  
DATED : December 22, 2020  
INVENTOR(S) : Otman A. Basir et al.

It is certified that error appears in the above-identified patent and that said Letters Patent is hereby corrected as shown below:

In the Claims

Claim 13, Column 6, Line 40; replace "the at least one sensor" with --at least one sensor--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*